No. 831,637. PATENTED SEPT. 25, 1906.
C. A. WALDO.
FLOAT.
APPLICATION FILED NOV. 4, 1905.
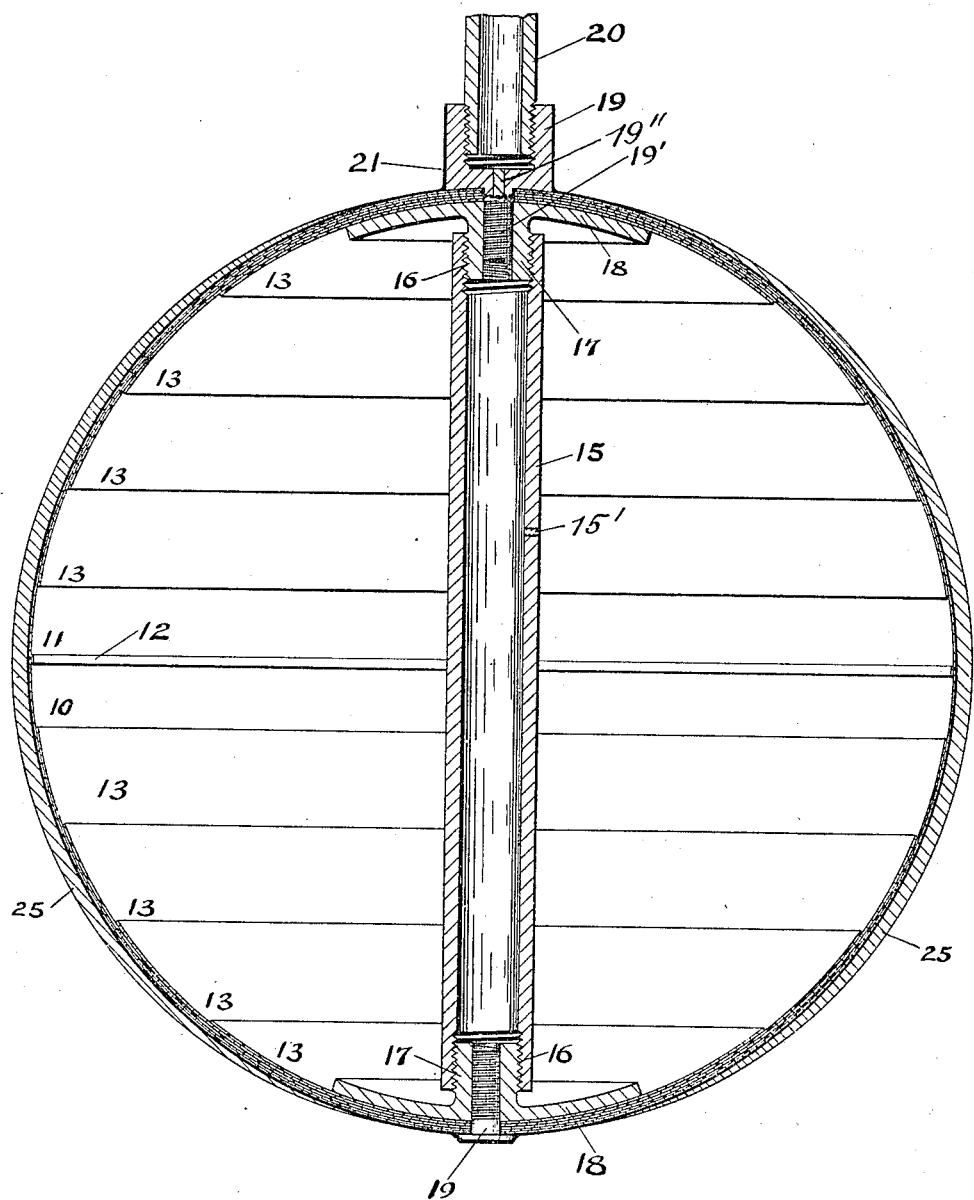
Witnesses
Fred. A. Duncan
J. A. Walsh
Inventor
Clarence A. Waldo
By
Bradford Hood
Attorneys

UNITED STATES PATENT OFFICE.

CLARENCE ABIATHAR WALDO, OF LA FAYETTE, INDIANA.

FLOAT.

No. 831,637.    Specification of Letters Patent.    Patented Sept. 25, 1906.

Application filed November 4, 1905. Serial No. 285,874.

*To all whom it may concern:*

Be it known that I, CLARENCE ABIATHAR WALDO, a citizen of the United States, residing at La Fayette, in the county of Tippecanoe and State of Indiana, have invented certain new and useful Improvements in Floats, of which the following is a specification.

The object of my invention is to produce a hollow float so constructed as to withstand high pressure; and the parts are so proportioned and arranged that when deformed under the simultaneous action of heat and high fluid-pressure they will assume a new shape having a power of resistance greater than that of the original shape.

The accompanying drawing is a diametrical section of an embodiment of my invention in a spherical float.

In the drawing, 10 and 11 indicate a pair of mating hollow members, which of course must be rotund and in the drawing are shown as hemispheres, although it is to be understood that the two mating members 10 and 11 may be portions of hollow ellipsoids, paraboloids, or other rotund bodies. The two members 10 and 11 at the mating plane are formed with interengaging portions 12, which are preferably so arranged that when the two members are mated a smooth exterior will be presented. The two members 10 and 11 are to be formed in any desired manner—as by stamping, spinning, or otherwise—of very thin metal, preferably a metal which will not corrode materially in liquids. Probably the most preferable material is copper. A hollow body of thin copper is unable to withstand high pressures, and in order to give the body sufficient resisting powers I nest within each member 10 and 11 one or more segmental hollow bodies 13, each of which conforms substantially to the interior of the member into which it is nested. In order to increase the resistance and compensate for deformation due to increased temperature, I prefer to make the exterior of each segment 13 of a rotundity which is slightly greater than the concavity of the body into which it is to be nested, so that when the several parts are clamped together at the pole each outer member will be placed in tensional stress by the member which is nested therein. For instance, if the members 10 and 11 are hemispheres then the segments 13 will each have a radius of curvature for its exterior sustantially equal to the radius of curvature of the exterior of the member into which it is nested, so that when the various members are nested and clamped at the pole the outer segment 13 will place the equator of the member 10 or 11 under an expanding tension, and the pole of the member 10 will be slightly flattened. A similar deformation of each segment 13 will be accomplished by the member 13 nested therein, so that (in the spherical form) when the parts are finally assembled the two members 10 and 11, with their nested segments, will form a spheroid slightly flattened at the poles and with the equator pushed outward to meet and resist external fluid-pressure. In order to accomplish this result, I provide a hollow member 15, which is provided at each end with a head-piece 17, threaded into the member 15 for convenience in accurate adjustment. Each head-piece 17 is provided with a segmental head 18, the rotundity of the exterior surface of which is slightly greater than the rotundity of the interior of the adjacent segment 13, for the reason already stated. Threaded into one of the head-pieces 17 and passing through perforations formed at the poles of the member 10 and the various segments 13 which are nested therein, is a screw 19, headed at its outer end and capable of drawing the member 10 and the several segments 13 snugly down upon the adjacent head 18, thus placing the several members in tension and oblating them slightly, as already described. At the other end the member 11 and nested segments 13 are clamped upon their head 18 by means of a clamping-piece 19, provided with a threaded portion 19'. Piece 19 is also threaded at its outer end to receive a valve-rod 20. An opening 19'' is formed inwardly through the threaded shank 19', so as to form a communication with the interior of the member 15, and an opening 15' forms a communication between the interior of member 15 and the interior of the float.

With the parts thus far described the method of assembling will be as follows: The member 10 and its nested segments 13 will be clamped upon the proper head 18, and the member 11 with its nested segments 13 will be similarly clamped upon their head 18. The two members 17 will then be screwed into the connecting member 15 until the adjacent edges 12 of the two members 10 and 11 are brought tightly together, whereupon the seam may be soldered or otherwise sealed, the air within having a free passage out through the openings 15' and 19''. The opening 19'' is then plugged, as shown, and the whole article placed in a bath of molten metal, which will form an impervious coating 21 over all the parts, so as to seal all joints, or the molten coat under some circumstances may be omitted. I prefer to use a bath of molten tin; but any other suitable material may be substituted.

In view of the fact that the interior segments 13 are protected thoroughly from the action of the fluid into which the float is to be placed, it will be readily seen that these segments may be made of any desired stiff and resilient material, which, under ordinary circumstances, would be unavailable for the manufacture of floats. For instance, steel, which would rust if exposed to the fluid, can be used for the internal segments 13.

Under initial conditions it will be seen that a float constructed in the manner described will have its equator—i. e., in the plane at right angles to the member 15—in expanding stress, and the member 15 will be in tension, serving as a tie. If now the article be subjected to external fluid-pressure without rise of temperature, the tendency to deform will be toward a further flattening at the poles at right angles to the equator-plane. This will serve to strengthen the equator-arch, as the tendency will be to increase the curvature thereof, and when this deformation takes place the member 15 finally comes into action as a strut, so that the tendency to deform, caused by external fluid-pressure, thus brings the parts into a stronger position than the initial position. The subjection of the float to increased temperature does not alter the direction of this tendency, for if the external members be formed of copper and the internal segments of steel the coefficient of expansion of the copper being greater the external members will expand more than the internal members, both by reason of the larger coefficient of expansion and also by reason of the fact that the conduction of heat to the interior will be lessened owing to the fact that the segments 13 are merely nested without being directly connected, and there will be a slight arching of the equator of the external members; but as the external pressure is increased any deformation of the parts tends to bring the external members down upon the stiffening-segments, and thus, as deformation continues, the several segments 13 are successively brought into play, so that any deformation gives it successively higher resistance to further change. For very high pressures I deem it advisable to further oblate the sphere by attaching an annular lune 25 at right angles to the member 15, with greatest thickness along the equator and thinning out toward the poles. This may be done in any desired manner; but perhaps the best plan will be to produce the annular lune or shell by electrodeposition. The thickness and extent of the shell 25 may be accurately predetermined by the size and relative position of the anode used, the shell being obtained by placing the float in an electrolytic bath inside of an annular anode of desired shape, the rate of deposit, as is well known, bearing a definite relation to the shortest distance between the anode and the point of deposit. It will be readily understood that the structure defined is not to be limited to spherical constructions, and in a companion application I have illustrated a cylindrical float the ends of which are formed in the same manner.

I claim as my invention—

1. A hollow article comprising a pair of mating hollow members, and an independent stiffening hollow segment nested within each of said members and attached at the poles.

2. A hollow article comprising a pair of mating hollow members substantially forming a body of revolution about one axis, and an independent stiffening hollow segment nested within each of said members and attached at the poles.

3. A hollow article comprising a pair of mating hollow members, an independent stiffening hollow segment nested within each of said members and attached at the poles, and a diametrical strengthening member extending between the poles of the nested members.

4. A hollow article comprising a pair of mating hollow members substantially forming a body of revolution about one axis, an independent stiffening hollow segment nested within each of said members and attached at the poles, and a diametrical strengthening member extending between the poles of the nested members.

5. A hollow article comprising a pair of mating hollow members, an independent stiffening hollow segment nested within each of said members and attached at the poles, a diametrical strengthening member extending between the poles of the nested members, and means for accurately adjusting the effective length of said strengthening member.

6. A hollow article comprising a pair of mating hollow members substantially forming a body of revolution about one axis, an independent stiffening hollow segment nested within each of said members and attached at the poles, a diametrical strengthening member extending between the poles of the nested members, and means for accurately adjusting the effective length of said strengthening member.

7. A hollow article comprising a pair of substantially hemispherical hollow members, a plurality of hollow spherical segments of decreasing altitudes nested within each hemispherical member, and means at the poles for clamping the several segments to the hollow member within which they are nested.

8. A hollow article comprising a pair of mating hollow members, a plurality of hollow segments of decreasing altitudes nested within each mating member, and means at the poles for clamping the several segments to the hollow member within which they are nested.

9. A hollow article comprising a pair of substantially hemispherical hollow members, a spherical segment having a radius of curvature of its exterior slightly greater than the radius of curvature of the interior of the hemispherical members and nested in said hemispherical members, and means at the poles for clamping the nested members.

10. A hollow article comprising a pair of mating hollow members, a hollow segment having a radius of curvature of its exterior slightly greater than the radius of curvature of the interior of the mating members and nested in said mating members, and means at the poles for clamping the nested members.

11. A hollow article comprising a pair of substantially hemispherical hollow members, each of said members having nested therein a plurality of hollow spherical segments of decreasing altitudes, and means at the poles only for clamping the several nested members together.

12. A hollow article comprising a pair of mating hollow members, each of said members having nested therein a plurality of hollow segments of decreasing altitudes, and means at the poles only for clamping the several nested members together.

13. A hollow article comprising a pair of substantially hemispherical hollow members, each having nested therein a plurality of hollow spherical segments of decreasing altitudes, the radius of curvature of the exterior of each of said spherical segments being slightly greater than the radius of curvature of the interior of the segment within which it is immediately nested, and means at the poles only for clamping the several nested members together.

14. A hollow article comprising a pair of mating hollow members, each having nested therein a plurality of hollow segments of decreasing altitudes, the radius of curvature of the exterior of each of said segments being slightly greater than the radius of curvature of the interior of the segment within which it is immediately nested, and means at the poles only for clamping the several nested members together.

15. A hollow article comprising a pair of substantially hemispherical hollow members, each having nested therein a plurality of hollow spherical segments of decreasing altitudes, the radius of curvature of the exterior of each of said spherical segments being slightly greater than the radius of curvature of the interior of the segment within which it is immediately nested, an internal strengthening member provided at each end with a rotund head and means by which one set of nested elements may be clamped to each of said heads, substantially as and for the purpose set forth.

16. A hollow article comprising a pair of mating hollow members, each having nested therein a plurality of hollow segments of decreasing altitudes, the radius of curvature of the exterior of each of said segments being slightly greater than the radius of curvature of the interior of the segment within which it is immediately nested, an internal strengthening member provided at each end with a rotund head and means by which one set of nested elements may be clamped to each of said heads, substantially as and for the purpose set forth.

17. A hollow article comprising a pair of mating members under an initial expanding stress in the equatorial zone, and an internal diametrical strut attached to said members under initial tension and substantially at right angles to the expanding-stress zone of the mating members.

18. A hollow article comprising a pair of mating hollow members, means for placing the adjacent equatorial zones of said members under initial expansion, means for placing the polar regions under initial compression, and an internal member arranged to serve as a strut between the polar regions upon oblation of the body at the poles.

19. A hollow article comprising a thin rotund shell in which the equatorial zone is under initial expansion and the polar regions under initial distortion toward collapse, and an internal strengthening member arranged between the poles and serving as a strut between the polar regions against collapse.

20. A hollow article comprising a thin rotund shell in which the equatorial zone is under initial expansive stress, and an internal strengthening member to the opposite ends of which the polar regions are connected and distorted toward collapse, said strengthening member thereby serving initially as a tie between the oblated polar regions and as a strut against external pressure.

21. A hollow article comprising a pair of mating hollow members, a stiffening hollow segment nested within each of said members, and an annular equatorial strengthening-lune attached to the exterior.

22. A hollow article comprising a pair of mating hollow members substantially forming a body of revolution about one axis, a stiffening hollow segment nested within each of said members, and an annular equatorial strengthening-lune attached to the exterior.

23. A hollow article comprising a pair of mating hollow members, a stiffening hollow segment nested within each of said members, a diametrical strengthening member extending between the poles of the nested members, and an annular equatorial strengthening-lune attached to the exterior.

24. A hollow article comprising a pair of mating hollow members substantially forming a body of revolution about one axis, a stiffening hollow segment nested within each of said members, a diametrical strengthening member extending between the poles of the nested members, and an annular equatorial strengthening-lune attached to the exterior.

25. A hollow article comprising a pair of mating hollow members, a stiffening hollow segment nested within each of said members, a diametrical strengthening member extending between the poles of the nested members, means for accurately adjusting the effective length of said strengthening member, and an annular equatorial strengthening-lune attached to the exterior.

26. A hollow article comprising a pair of mating hollow members substantially forming a body of revolution about one axis, a stiffening hollow segment nested within each of said members, a diametrical strengthening member extending between the poles of the nested members, means for accurately adjusting the effective length of said strengthening member, and an annular equatorial strengthening-lune attached to the exterior.

27. A hollow article comprising a pair of substantially hemispherical hollow members, a plurality of spherical segments of decreasing altitudes nested within each hemispherical member, means for clamping the several segments to the hollow member within which they are nested at the poles, and an annular equatorial strengthening-lune attached to the exterior.

28. A hollow article comprising a pair of mating hollow members, a plurality of hollow segments of decreasing altitudes nested within each mating member, means for clamping the several segments to the hollow member within which they are nested at the poles, and an annular equatorial strengthening-lune attached to the exterior.

29. A hollow article comprising a pair of substantially hemispherical hollow members, a spherical segment having a radius of curvature of its exterior slightly greater than the radius of curvature of the interior of the hemispherical members, and nested in said hemispherical members means for clamping the nested members at the poles, and an annular equatorial strengthening-lune attached to the exterior.

30. A hollow article comprising a pair of mating hollow members, a hollow segment having a radius of curvature of its exterior slightly greater than the radius of curvature of the interior of the mating members, and nested in said mating members means for clamping the nested members at the poles, and an annular equatorial strengthening-lune attached to the exterior.

31. A hollow article comprising a pair of substantially hemispherical hollow members, each of said members having nested therein a plurality of hollow spherical segments of decreasing altitudes, means at the poles only for clamping the several nested members together, and an annular equatorial strengthening-lune attached to the exterior.

32. A hollow article comprising a pair of mating hollow members, each of said members having nested therein a plurality of hollow segments of decreasing altitudes, means at the poles only for clamping the several nested members together, and an annular equatorial strengthening-lune attached to the exterior.

33. A hollow article comprising a pair of substantially hemispherical hollow members, each having nested therein a plurality of hollow spherical segments of decreasing altitudes, the radius of curvature of the exterior of each of said spherical segments being slightly greater than the radius of curvature of the interior of the segment within which it is immediately nested, means at the poles only for clamping the several nested members together, and an annular equatorial strengthening-lune attached to the exterior.

34. A hollow article comprising a pair of mating hollow members each having nested therein a plurality of hollow segments of decreasing altitudes, the radius of curvature of the exterior of each of said segments being slightly greater than the radius of curvature of the interior of the segment within which it is immediately nested, means at the poles only for clamping the several nested members together, and an annular equatorial strengthening-lune attached to the exterior.

35. A hollow article comprising a pair of substantially hemispherical hollow members, each having nested therein a plurality of spherical segments of decreasing altitudes, the radius of curvature of the exterior of each of said spherical segments being slightly greater than the radius of curvature of the interior of the segment within which it is immediately nested, an internal strengthening member provided at each end with a rotund head and means by which one set of nested elements may be clamped to each of said heads, and an annular equatorial strengthening-lune attached to the exterior, substantially as and for the purpose set forth.

36. A hollow article comprising a pair of mating hollow members, each having nested therein a plurality of hollow segments of decreasing altitudes, the radius of curvature of the exterior of each of said segments being slightly greater than the radius of curvature of the interior of the segment within which it is immediately nested, an internal strengthening member provided at each end with a rotund head and means by which one set of nested elements may be clamped to each of said heads, and an annular equatorial strengthening-lune attached to the exterior, substantially as and for the purpose set forth.

37. A hollow article comprising a pair of mating hollow members, and an internal strengthening diametrical member arranged between the poles and to which the said hollow members are attached, said hollow members being placed under an initial expanding stress at the equatorial plane at right angles to the strengthening member and the strengthening member initially under tension, and an annular equatorial strengthening-lune attached to the exterior.

38. A hollow article comprising a pair of mating hollow members, means for placing the adjacent equatorial zones of said members under initial expansion, means for placing the polar regions under initial compression an internal member arranged to serve as a strut between the polar regions upon oblation of the body at the poles, and an annular strengthening-lune attached to the exterior.

39. A hollow article comprising a thin rotund shell in which the equatorial zone is under initial expansion and the polar regions under initial distortion toward collapse, an internal strengthening member serving as a strut between the polar regions against collapse, and an annular equatorial strengthening-lune attached to the exterior.

40. A hollow article comprising a thin rotund shell in which the equatorial zone is under initial expansive stress, an internal strengthening member to the opposite ends of which the polar regions are connected and distorted toward collapse, said strengthening member thereby serving initially as a tie between the oblated polar regions and as a strut against external pressure, and an annular equatorial strengthening-lune attached to the exterior.

41. A hollow article comprising a thin rotund shell in which the equatorial zone is stronger than the polar zone's, and an internal strengthening member arranged between the poles and serving as a strut between the polar regions against collapse.

42. A hollow article comprising a thin rotund shell, an internal strengthening member arranged between the poles and serving as a strut between the polar regions against collapse, and an annular equatorial strengthening-lune attached to said shell.

In witness whereof I have hereunto set my hand and seal, at La Fayette, Indiana, this 27th day of October, A. D. 1905.

CLARENCE ABIATHAR WALDO. [L. S.]

Witnesses:
EDGAR G. COLLINS,
GEO. D. PARKS.